United States Patent [19]

Vincent

[11] Patent Number: 5,556,015
[45] Date of Patent: Sep. 17, 1996

[54] CONTAINER WITH ACTIVATABLE MOUNTING ASSEMBLY

[76] Inventor: Robert C. Vincent, 104 Rose Twig La., North Wales, Pa. 19454

[21] Appl. No.: 210,192

[22] Filed: Feb. 24, 1994

[51] Int. Cl.$^6$ .................................................. B60R 9/055
[52] U.S. Cl. ......................... 224/328; 224/572; 224/309; 74/553
[58] Field of Search ........................ 16/18 CG; 74/553; 224/309, 310, 321, 328, 572; 248/188.2, 188.4

[56] References Cited

U.S. PATENT DOCUMENTS

| | | | |
|---|---|---|---|
| 1,627,471 | 5/1927 | Wadsworth | 16/18 CG |
| 2,440,821 | 5/1948 | Godwin | 224/328 |
| 2,621,836 | 12/1952 | McMiller | 224/328 |
| 2,920,802 | 1/1960 | Cook | 224/328 |
| 3,868,079 | 2/1975 | Johnson | 248/188.4 |
| 3,918,669 | 11/1975 | Osterhout | 224/309 |
| 5,332,182 | 7/1994 | Weisz | 248/188.4 |

FOREIGN PATENT DOCUMENTS

| | | | |
|---|---|---|---|
| 1212430 | 3/1966 | Germany | 224/309 |
| 4001927 | 7/1991 | Germany | 74/553 |

*Primary Examiner*—David Scherbel
*Assistant Examiner*—Terrence R. Till

[57] ABSTRACT

Disclosed is a generally elongated container of stiff, durable material, preferably hard molded plastic, adapted to store within the interior thereof relatively large and bulky personal items such as skis, snowboards, bicycles, golf clubs and the like. Located on one surface of the container are a multiplicity of spaced mounting assemblies each of which is manually activatable between a first inactive condition where it is recessed into the wall of the container, and an active condition where the mounting assembly is extended along an axis orthogonal to the sidewall of the container. Each mounting assembly, in turn, comprises an extensible support rod terminating in a foot pad of relatively soft durable material for engaging the surface of a vehicle roof with the rod being connected to the foot pad via a universal pivotal joint or connection so that each foot pad may swivel separately relative to its corresponding rod and conform to the convex curvature of the vehicle roof. In this manner, the elongated container may be mounted on the vehicle roof in a substantially horizontal position parallel to the vehicle's longitudinal axis with each of the extended foot pads of the different mounting assemblies firmly and securely engaging the vehicle roof.

12 Claims, 4 Drawing Sheets

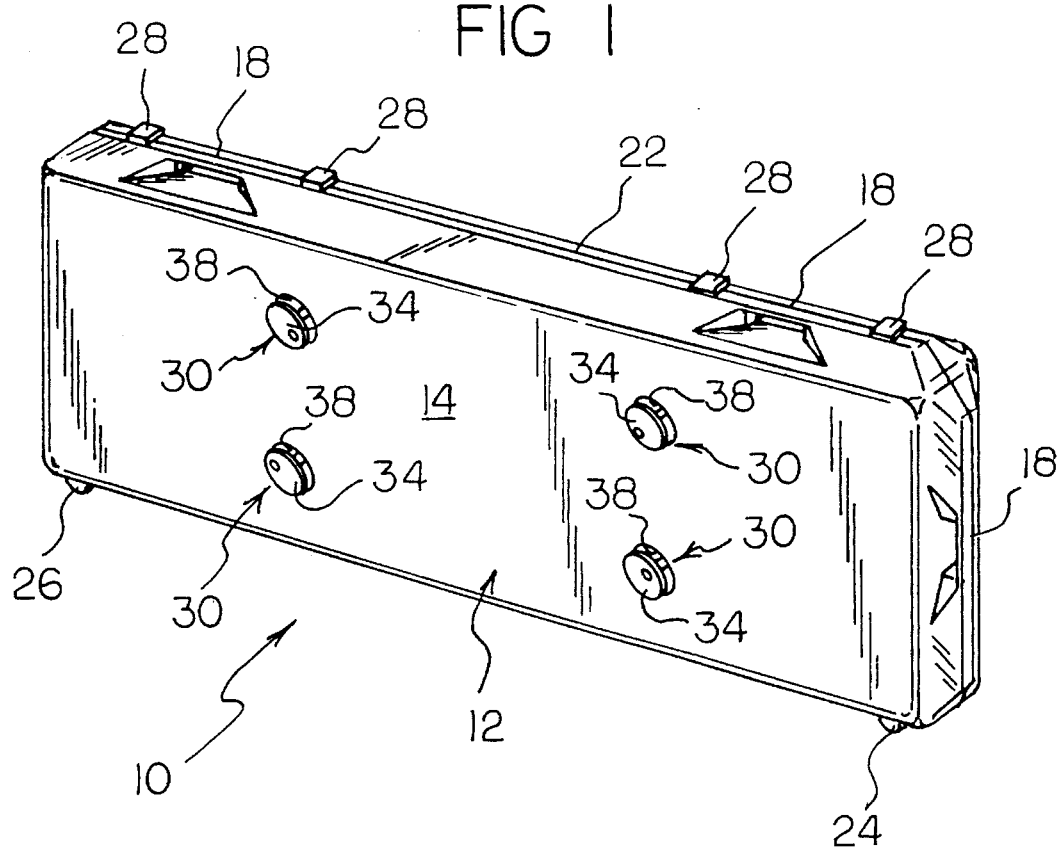
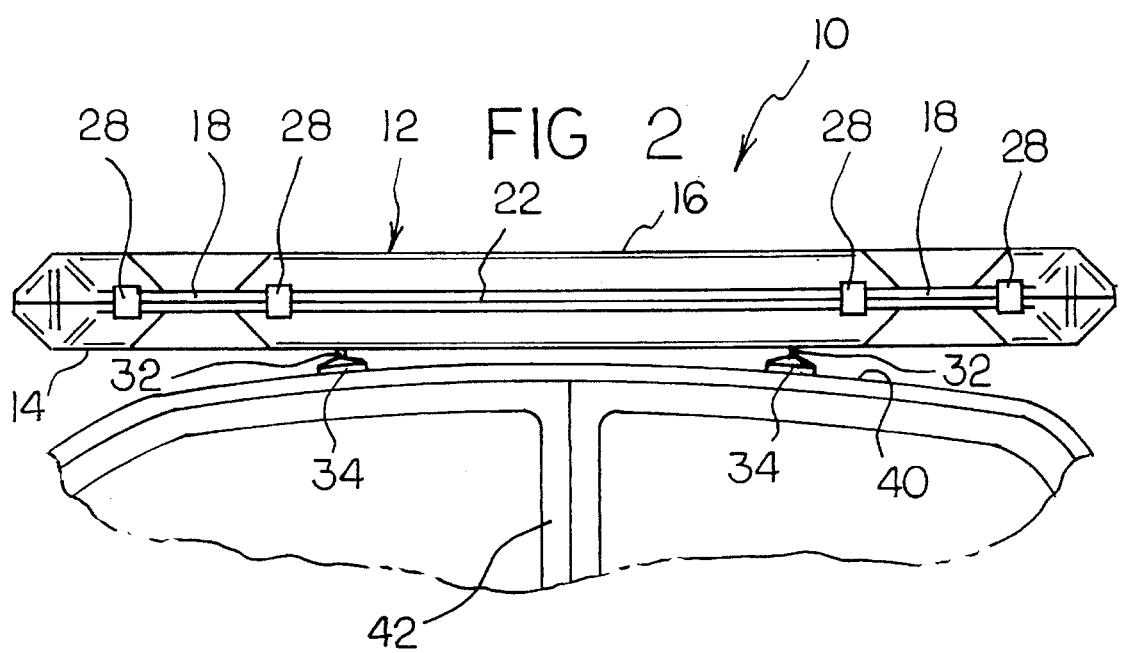

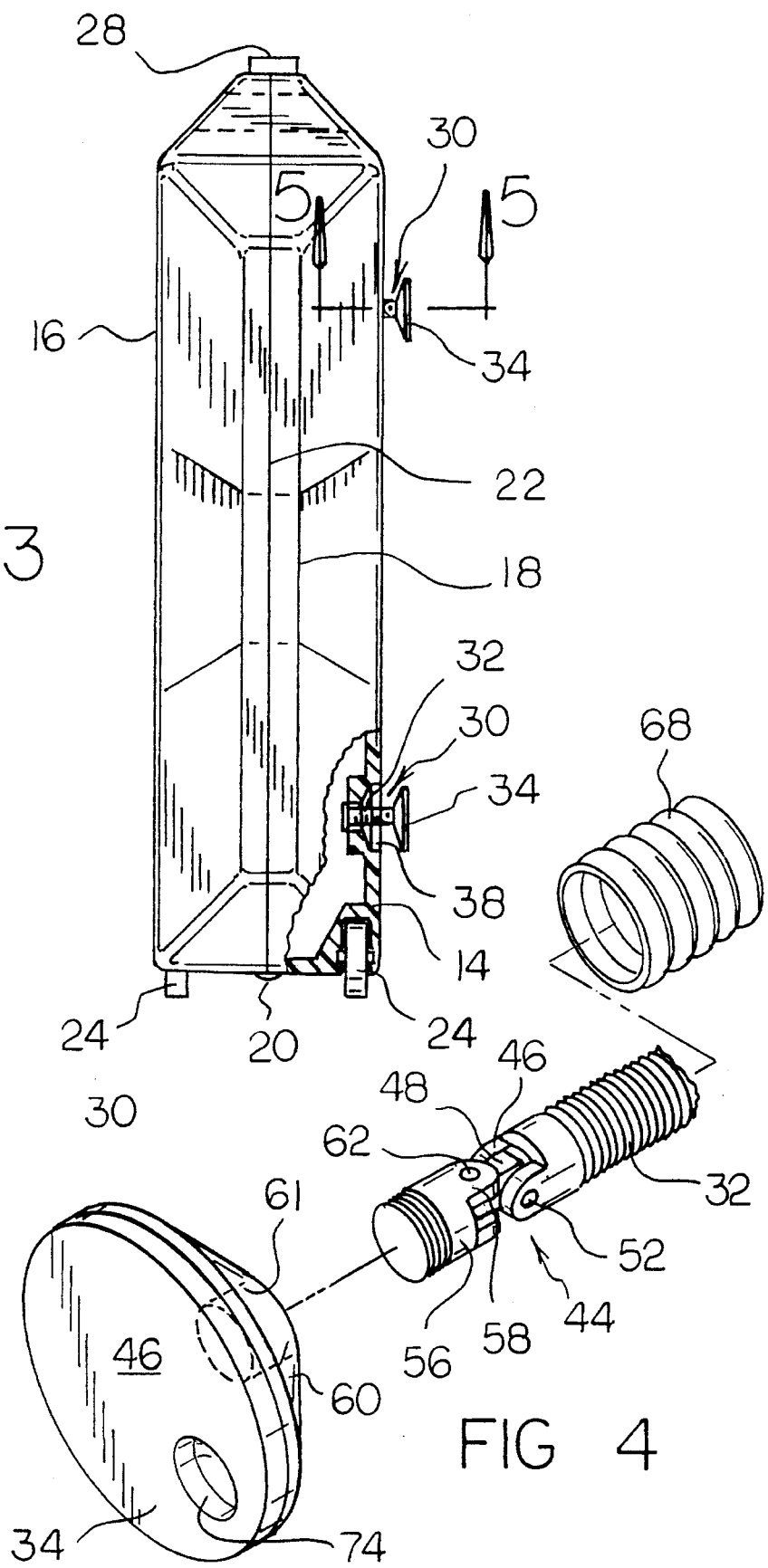

CONTAINER WITH ACTIVATABLE MOUNTING ASSEMBLY

BACKGROUND OF THE INVENTION

1. Field of the Invention

The present invention relates generally to containers, and more particularly, to a container having self-contained means for facilitating the mounting of the container on a surface such as, for example, the roof of a vehicle.

2. Description of the Prior Art

Roof racks securely mounted to the roof of a vehicle are commonly used to facilitate the transportation of large and bulky personal items such as luggage, skis, bicycles and the like. A longstanding need exists for a container which may be used to store relatively large and bulky personal items such as the aforementioned skis, bicycles and the like, and which container may be sent via a first mode of transportation (e.g. a truck, train, boat or airplane) to a first destination and then mounted on the roof of a vehicle comprising a second mode of transportation (e.g. a rented automobile, taxi, and bus) for travel to a second subsequent destination even though the roof of the vehicle does not have mounted thereon a conventional roof rack or similar container securement apparatus.

This need is satisfied by the present invention which broadly speaking contemplates a container for storing large and bulky personal items and which container includes a self-contained apparatus for facilitating the mounting of the container on the roof top of a vehicle lacking a conventional roof rack or other baggage securement device. Additional advantages of the present invention over the prior art also will be rendered evident by the following description thereof.

SUMMARY OF THE INVENTION

To achieve the foregoing and other advantages, the present invention, briefly described, provides a generally elongated container of stiff, durable material, preferably hard molded plastic, adapted to store within the interior thereof relatively large and bulky personal items such as skis, snowboards, bicycles, golf clubs and the like. Located on one surface of the container are a multiplicity of spaced mounting assemblies each of which is manually activatable between a first inactive condition where it is recessed into the wall of the container, and an active condition where the mounting assembly is extended along an axis orthogonal to the sidewall of the container. Each mounting assembly, in turn, comprises an extensible support rod terminating in a foot pad of relatively soft durable material for engaging the surface of a vehicle roof with the rod being connected to the foot pad via a universal pivotal joint or connection so that each foot pad may swivel separately relative to its corresponding rod and conform to the convex curvature of the vehicle roof. In this manner, the elongated container may be mounted on the vehicle roof in a substantially horizontal position parallel to the vehicle's longitudinal axis with each of the extended foot pads of the different mounting assemblies firmly and securely engaging the vehicle roof.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least two preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved container with activatable mounting assembly which has all of the advantages of the prior art and none of the disadvantages.

It is another object of the present invention to provide a new an improved container with activatable mounting assembly which may be easily and efficiently manufactured and marketed.

It is a further objective of the present invention to provide a new and improved container with activatable mounting assembly that is of durable and reliable construction.

An even further object of the present invention is to provide a new and improved container with activatable mounting assembly susceptible of a low cost of manufacture with regard to both materials and labor, and which accordingly is then susceptible of low prices of sale to the consuming public, thereby making such container apparatus available to the buying public.

Still yet a further object of the present invention is to provide a new and improved container with activatable mounting assembly that is adapted to store relatively large and bulky items and be securely mounted on the roof of a vehicle.

Yet still another object of the present invention is to provide a new and improved container with activatable mounting assembly wherein the mounting assembly may be recessed into the sidewall of the container when the latter is used in one mode of transportation and the mounting assembly may be extended to engage the roof surface of a vehicle when the container used in another or second mode of transportation.

Another object of the present invention is to provide a new and improved container mounting apparatus that includes a multiplicity of extensible mounting assemblies each of which has a foot pad that is adapted to independently adjusted to conform to the irregular convex roof curvature of a vehicle roof top.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference now should be had to the accompanying drawings and descriptive matter in which there are illustrated mostly preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 1 is a perspective view showing the container with activatable mounting assembly according to the present invention.

FIG. 2 is an elevational view of the container with activatable mounting assembly of FIG. 1 schematically showing the preferred mounting position thereof on the roof of a vehicle.

FIG. 3 is an elevational end view partly in cross-section of the container with activatable mounting assembly of FIGS. 1 and 2.

FIG. 4 is an exploded assembly in perspective of a first preferred embodiment of the mounting assembly used in connection with the present invention.

DESCRIPTION OF THE PREFERRED EMBODIMENT

Figure 5:
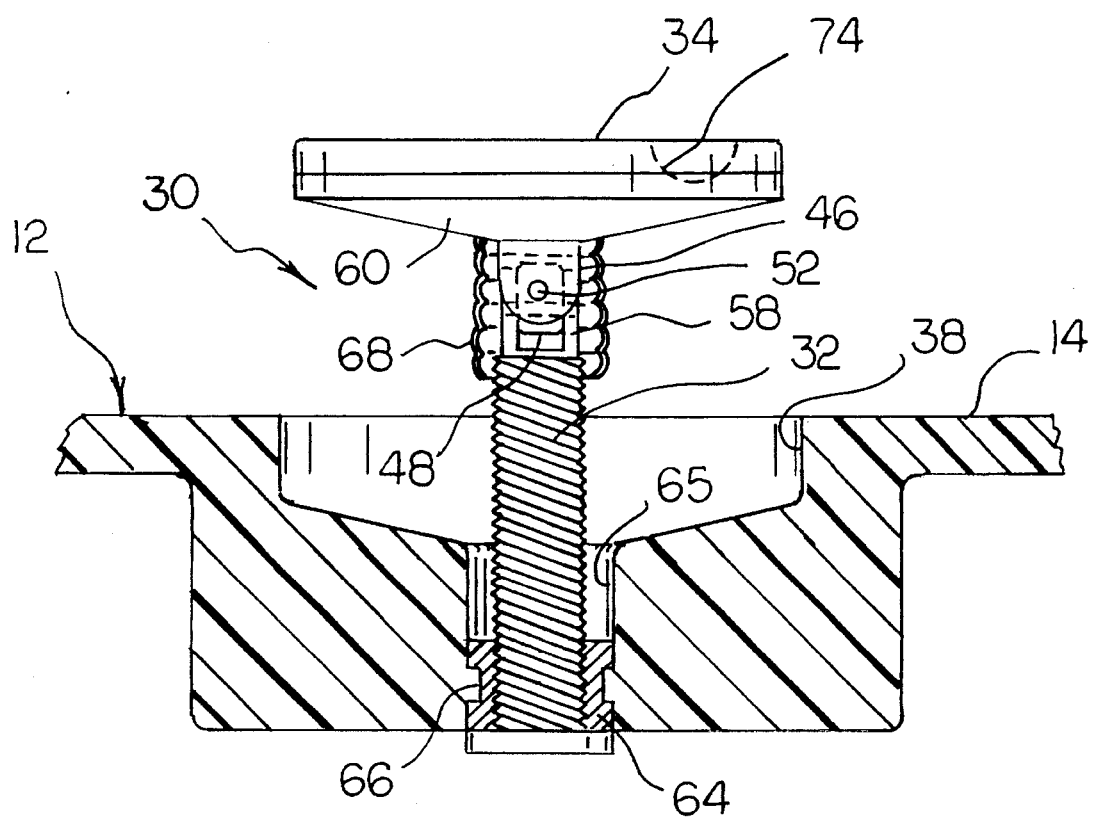
FIG. 5 is a cross-sectional enlarged view taken along line 5—5 of FIG. 3 and showing a mounting assembly of the container of the present invention in the extended activated condition.

With reference now to the drawings, a new and improved container with activatable mounting assembly embodying the principles and concepts of the present invention will be described.

Turning initially to FIGS. 1–6, there is shown a first preferred embodiment of the container with activatable mounting assembly according to the present invention generally designated by reference numeral 10. Container 10 generally comprises an elongated, rectangularly shaped housing or outer shell 12 having opposed substantially flat sides 14, 16 and a series of molded-in-place carrying handles 18 spaced around three sides of the housing. The fourth side has a central hinge 20 permitting the two halves of the housing to open and close relative to each other in the manner of a conventional suitcase or similar piece of luggage. A central seam 22 thus extends peripherally about the three non-hinged sides of the housing. Separate pairs of wheel assemblies 24, 26 are suitably affixed at opposite ends of the fourth or hinged side substantially as shown to enable the housing to easily be pulled along the ground with a tether (not shown). A multiplicity of conventional lockable latch assemblies 28 preferably are provided spaced along the top side of the housing substantially as shown to selectively allow the housing halves to be opened and then locked closed in manner believed apparent without further discussion inasmuch as the details of the lockable latches 28 are outside the scope of the present invention.

In its preferred form, housing or outer shell 12 is fabricated of a stiff, strong, hard, durable molded plastic material so as to provide a hard protective shell that is light in weight, yet suitable for protecting and concealing costly personal items of a relatively large or bulky nature such as, by way of example only, and without limiting the present invention, skis, ski poles, snowboards, bicycles, golf clubs and the like, when it is desired to transport such items relatively long distances as by airplane bus, boat, truck or train, and it is further desired to efficiently safeguard the articles against damage theft or other loss during the baggage handling process commonly encountered when such articles are so transported. An especially suitable material is high density polyethylene which may be either vacuum formed or injection molded to form housing 12 in a manner well known and understood in the plastics forming art. An ultra-high molecular-weight polyethylene yields a formed article having excellent tensile strength and resistance to deformation under wide temperature cycling and therefore is particularly preferred.

In this regard, the interior of the housing 12 may be fitted with a suitable cushioning material (not shown) of a flexible character such as foam rubber or the like having cut-outs or receptacles in the shape of a particular article(s) (e.g. a pair of skis and a pair of ski poles) in order to firmly position the articles inside the housing and maintain the articles in a relatively fixed position therein.

In accordance with the present invention, a multiplicity of separate, selectively and independently activatable mounting assemblies 30 are provided in at least one side of the housing 12, namely side 14, with the preferred arrangement comprising four (4) such assemblies spaced apart to form a rectangular arrangement substantially as depicted in FIG. 1. Each mounting assembly 30, in turn, comprises an extensible support rod or shank 32 the distal end of which terminates in a disc shaped foot pad 34 of relatively soft, flexible material such as rubber, with neoprene rubber being particularly preferred. An important feature of the present invention is the ability of the extensible mounting assembly to be activated when and as desired from an in-active position (FIG. 6) where the extensible support rod is withdrawn into the sidewall 14, and the foot pad is nested in a recess 38 of complimentary shape to the foot pad such that the foot pad and the mounting assembly are rendered substantially flush with respect to the outside wall surface of the housing, to an active position (FIG. 1 through 3 and 5) where the rod 32 is extended and the foot pad 34 is adapted to engage the surface 40 of a vehicle 42 as shown to best advantage in FIG. 2.

Figure 6:
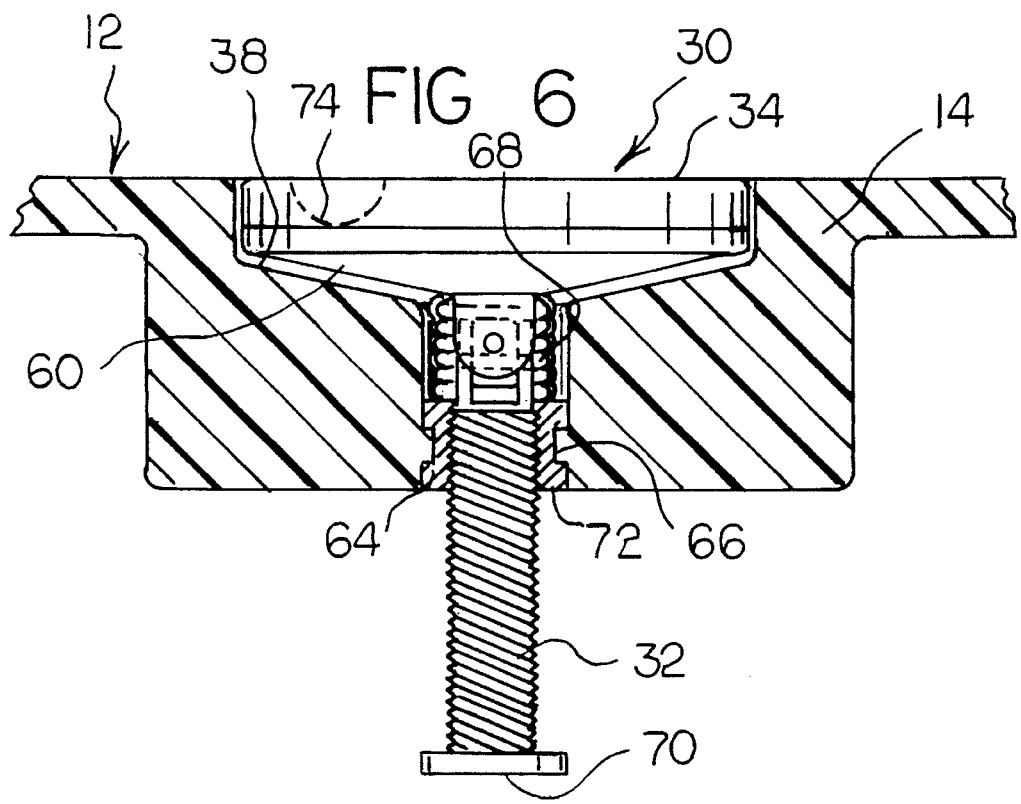
FIG. 6 is a cross-sectional enlarged view taken along line 5—5 of FIG. 3 and showing a mounting assembly of the container of the present invention in the recessed non-activated condition.

Turning now to FIGS. 4 through 6, the details of the mounting assembly are shown. In a first preferred embodiment, rod 32 is joined to foot pad 34 via a universal joint or connection generally indicated by reference numeral 44 which connection permits the footpad to swivel or pivot at any angle relative to the fixed central axis of rod 32. By this arrangement, the foot pad bottom surface 46 will be caused to firmly and securely engage the convex surface 40 of vehicle 42 while maintaining housing 12 in a substantially horizontal position on the vehicle roof top as substantially shown in FIG. 2 (i.e. parallel to the vehicle's longitudinal More specifically, rod 32 terminates in a first bifurcation 46 which engages one end of a quadrature link 48 by means of a first transverse pin 52 suitably attached to bifurcation 46 through a pair of holes therein and passing through a first hole in quadrature link 48. Similarly, a rod extension 56 is suitably fixed to foot pad conical support shell 60 by means of a threaded central recess 61 and complimentary male fastener threads on the distal extremity of rod extension 56. The opposed end of rod extension 56 terminates in a second bifurcation 58 which engages the other end of quadrature link 48 by means of a second transverse pin 62 suitably attached to the second bifurcation through a pair of holes therein and passing through a second hole in quadrature link 48 with the second hole in the quadrature link having its axis rotated ninety degrees with respect to the axis of the aforementioned first hole in the quadrature link.

It will thus be appreciated that by this universal joint construction, the axis of rod extension (and the plane of foot pad bottom surface 46) may be caused to assume a wide range of different angular attitudes relative to the axis of rod 32 at any angular or rotational position of the foot pad relative to the fixed central axis defined by support rod 32.

Extensible rod 32 has a male threaded shank and is matingly engaged with a complimentary female bushing or nut 64 preferably molded in place and fixed to the surrounding plastic material of wall 14 at the bottom end of orthogonal recess or opening 65 passing through wall 14 substantially as depicted in FIGS. 5 and 6. The exterior of bushing 64 preferably has a circumferential groove 66 to enhance its purchase on the surrounding plastic material. The upper end of recess 65 is circumferentially enlarged with respect to the threaded periphery of the shank of rod 32 to provide space for accommodating a flexible, rubber protective sleeve or boot 68 circumferentially and co-axially disposed about universal joint 44 and affixed in a suitable manner to conical support shell 60 as by the use of an adhesive. Thus, when the rod is rotated relative to bushing 64 and thereby caused to retract to the position shown in FIG. 6, the sleeve 68 is axially compressed into recess 65 and forms a seal therein against moisture, dirt, and so on. An end cap 70 is suitably affixed to the top of rod 32 and provides a stop member adapted to engage the bottom annular surface 72 of bushing 64 when the rod is rotated to extend upwardly as shown in FIG. 5 thereby limiting the extensible movement of the rod and the foot pad and preventing complete unscrewing of the rod relative to the bushing. To facilitate easy rotation of the foot pad and the rod relative to the bushing, a finger depression 74 radially offset with respect to the central axis of the foot pad is suitably provided in the bottom surface 46 of the foot pad substantially as shown. Foot pad 34 may be attached to its conical supporting shell 60 in any convenient manner with securement by a suitable adhesive being mostly preferred.

Figure 7:
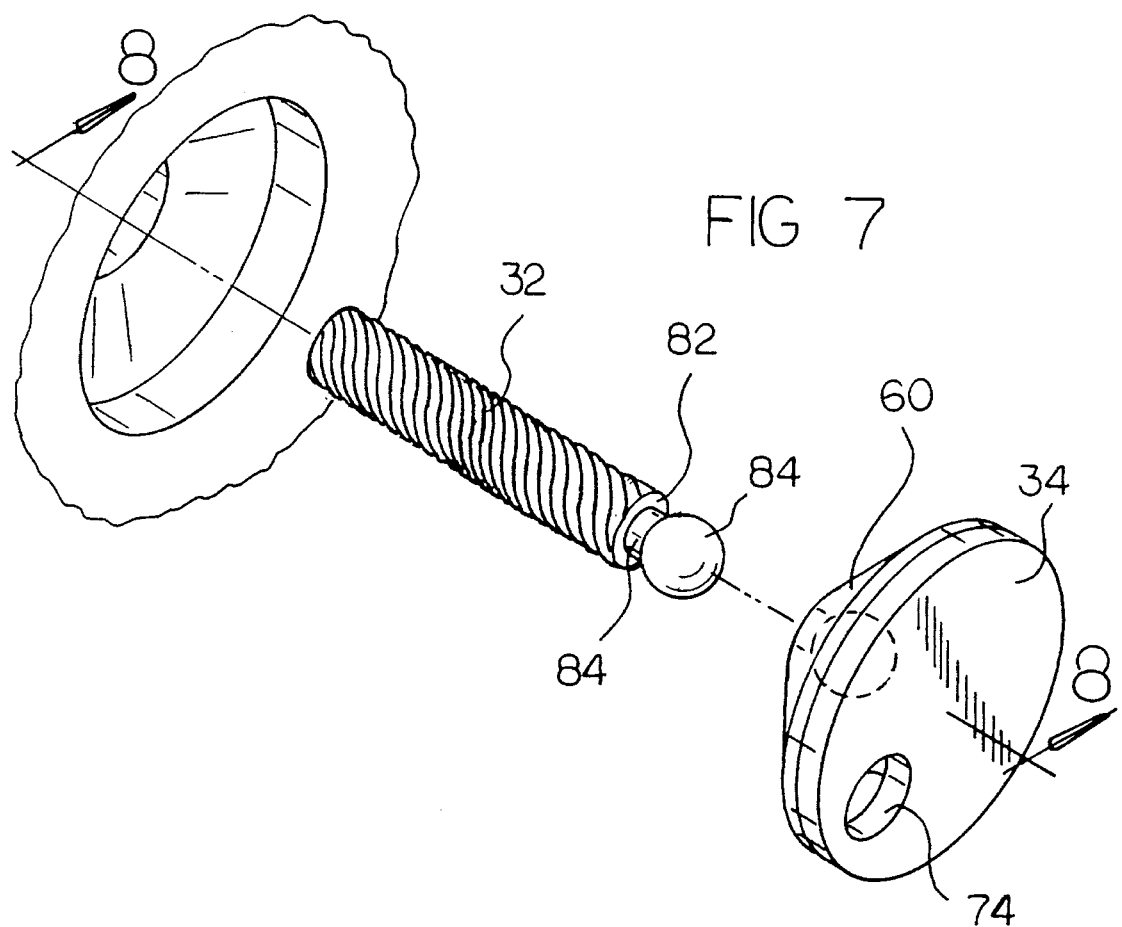
FIG. 7 is an exploded assembly in perspective of a second alternatively preferred embodiment of the mounting assembly used in connection with the present invention.
Figure 8:
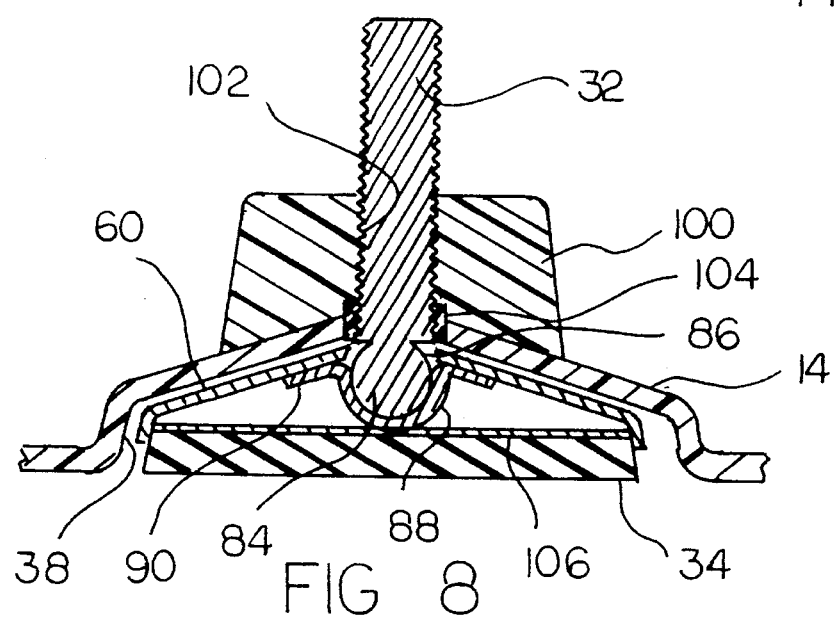
FIG. 8 is a cross-sectional elevational view taken along line 8—8 of FIG. 7.

Turning now to FIGS. 7 and 8 there is shown an alternatively preferred embodiment of the invention wherein similar reference numerals represent like parts already described. In the alternatively preferred embodiment of FIGS. 7 and 8, the universal joint connecting the extensible rod 32 and the foot pad is replaced by a less complicated, lower cost version featuring a ball and socket connection. Thus, extensible support rod 32 terminates at its distal end 82 in a post 84 supporting a ball 84 which latter extends through a central opening 86 in conical shell 60 to engage a socket 88 having an integral radially extending rim 90 which, in turn, is affixed to the underside of conical shell 60 substantially as shown. Rim 90 may be attached to the conical shell by rivets, welding or a suitable adhesive. The socket 88 is preferably of spring metal and frictionally engages the ball 84 sufficiently to transfer torque from the foot pad 34 to the rod 32. Hence, it will be appreciated that rotation of the foot pad about the central axis defined by rod 32 will cause extension or retraction of the rod relative to support block 100 which is fabricated of the same plastic material as wall 14 and is either bonded to the wall via a suitable adhesive or is molded integral with the wall as desired. The central recess 102 in the block 100 has a female threaded surface complimentary to the male threads on rod 32. A sealing bushing 104 of elastomeric material may be seated at the bottom of central recess 102 substantially as shown. The foot pad 34 may be affixed to support plate 106 which is press fitted into the conical shell 60.

The entire assembly comprising extensible rod 32, ball 84, socket 88, conical shell 60 and foot pad 34 easily may be replaced if broken or worn by merely unscrewing rod 32 from recess 102 and rotatably threadedly engaging the extensible rod of a new assembly into recess 102. The operation of the alternative embodiment of FIGS. 7 and 8 is in all other respects identical to that of the embodiment of FIGS. 1 through 6.

As mentioned above, the housing outer shell 12 of the invention is preferably made of a lightweight, strong, hard, molded plastic material such as vacuum or injection molded high density polyethylene with ultra-high-molecular-weight polyethylene (UHMWPE) being particularly preferred. The other parts of the container according to the invention may also be made from durable materials such as molded plastic, or metal, or combinations thereof as will occur to those of ordinary skill.

As to the manner of usage and operation of the present invention, the same should be apparent from the above description. Accordingly, no further discussion relating to the manner of usage and operation will be provided except to note that one or more conventional transverse straps forming no part of the present invention may be utilized to help tie-down the container when it is positioned as shown in FIG. 2 with such straps having connectors at either opposed end for engagement with either the gutter rail on the roof of the vehicle or the top portion of the side window frame of the vehicle door(s).

It is apparent from the above that the present invention accomplishes all of the objectives set forth by providing a new and improved container with activatable mounting assembly that is adapted to store relatively large and bulky items and be securely mounted on the roof of a vehicle; that features a unique self-contained mounting assembly which may be recessed into the sidewall of the container when the latter is used in one mode of transportation, and which may be extended to engage the roof surface of a vehicle when the container is used in another or second mode of transportation; and that includes a multiplicity of such extensible mounting assemblies each of which has a foot pad that is adapted to be independently adjusted in a rapid and easy manner to conform to the irregular convex roof curvature of a vehicle roof top.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the Abstract provided at the beginning of this specification is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A new and improved mounting assembly for a container for relatively large bulky items wherein said mounting assembly is adapted to support said container on an irregular surface, and wherein said container comprises at least one longitudinally elongated mounting surface defining a first longitudinal axis and a recess in said surface, said assembly comprising:

a longitudinally elongated support member defining a second axis, means for movably mounting said support member within said recess and for permitting selective movement of said support member along said second axis between a first recessed position and a second extended position, foot pad means having a bottom mounted on one end of said support member for engaging said irregular surface, pivotal connection means between said foot pad means and said one end of said support member for permitting said foot pad to pivot relative to said axis when said member is axially moved from said first position to said second position, and depression means located on the bottom of said foot pad means for selectively moving said support member between said first position where said foot pad means is substantially flush mounted relative to said mounting surface and said second position where said foot pad means extends beyond said mounting surface toward said irregular surface.

2. The mounting assembly of claim 1 wherein said pivotal connection means comprises a universal joint.

3. The mounting assembly of claim 1 wherein said universal joint is a ball and socket.

4. The mounting assembly of claim 1 wherein said mounting means comprises a threaded bushing mounted in said recess and said support member comprises an externally threaded rod matingly engaging said bushing, and said foot pad nests within said recess when said support member is in said first position.

5. The mounting assembly of claim 4 wherein said foot pad has a bottom surface, and said actuation means comprises a depression in said bottom surface such that selective manual engagement of said foot pad via said depression in said bottom surface thereof is effective to cause rotation of said foot pad and movement of said support member from said first position to said second position.

6. The mounting assembly of claim 4 wherein said orthogonally directed opening defines an annular space surrounding said externally threaded rod in at least a portion of said opening, said at least portion of said opening communicating with said recess, said rod having a flexible sleeve thereon, and said sleeve being axially received within said annular recess when said rod is moved to said first position.

7. The mounting assembly of claim 4 wherein said foot pad is disc shaped and extends radially with respect to said rod, said recess being shaped to accommodate said foot pad therein when said rod is moved to said first position.

8. The combination of the mounting assembly of claim 1 and a container, said container being elongated and rectangular in shape and having at least one substantially flat wall defining said mounting surface, said mounting assembly being mounted in said recess in said at least one substantially flat wall.

9. The combination defined in claim 8 wherein said irregular surface is the roof of a vehicle, said roof having a convex shape, and said at least one substantially flat wall of said container is adapted to be mounted parallel to the longitudinal axis of said vehicle with said foot pad of said mounting assembly engaging said convex surface when said mounting member is moved to said second position.

10. The combination of claim 9 wherein a multiplicity of said mounting assemblies are disposed in said at least one substantially flat wall.

11. The combination of claim 10 wherein said multiplicity comprises four in number and said multiplicity forms a rectangular pattern.

12. A new and improved mounting assembly for a container for relatively large bulky items wherein said mounting assembly is adapted to support said container on an irregular surface, and wherein said container comprises at least one longitudinally elongated mounting surface defining a first longitudinal axis and a recess in said surface, said assembly comprising:

a longitudinally elongated support member defining a second axis, means for movably mounting said support member within said recess and for permitting selective movement of said support member along said second axis between a first recessed position and a second extended position, foot pad means having a bottom on one end of said support member for engaging said irregular surface, and depression means located on the bottom of said foot pad means for selectively moving said support member between said first position where said foot pad means is substantially flush mounted relative to said mounting surface and said second position where said foot pad means extends beyond said mounting surface toward said irregular surface.

* * * * *